(12) United States Patent
Kramer et al.

(10) Patent No.: US 6,260,665 B1
(45) Date of Patent: Jul. 17, 2001

(54) SYSTEM AND METHOD FOR DETERMINING BRAKE LINING WEAR BASED ON COOLING WAVE PROPAGATION TIME

(75) Inventors: Dennis A. Kramer, Troy; Mark E. Malinowski, Farmington Hills, both of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/216,052

(22) Filed: Dec. 18, 1998

(51) Int. Cl.⁷ ........................................ F16D 66/00

(52) U.S. Cl. ........................ 188/1.11 L; 188/1.11 E

(58) Field of Search ................. 188/1.11 R, 1.11 W, 188/1.11 L, 1.11 E; 340/454; 116/208

(56) References Cited

U.S. PATENT DOCUMENTS

| | | | |
|---|---|---|---|
| 1,957,051 | 5/1934 | Norton | 73/32 |
| 2,117,027 | 5/1938 | Langbein | 73/341 |
| 2,494,369 | 1/1950 | Sparkes | 177/311 |
| 3,088,549 | 5/1963 | Borsa | 188/1 |
| 3,314,618 | 4/1967 | McDonald | 241/299 |
| 3,321,045 | 5/1967 | Veilleux | 188/1 |
| 3,398,246 | 8/1968 | Linet | 200/61.4 |
| 3,556,258 | 1/1971 | Winge et al. | 188/1 |
| 3,674,114 | 7/1972 | Howard | 188/1 A |
| 3,689,880 | 9/1972 | McKee et al. | 340/52 A |
| 3,800,278 | 3/1974 | Jaye et al. | 340/52 A |
| 3,805,228 | 4/1974 | Peeples | 340/52 A |
| 3,825,891 | 7/1974 | Kinast | 340/52 A |
| 3,914,734 | 10/1975 | Rigalt | 340/52 A |
| 3,958,445 | 5/1976 | Howard et al. | 73/7 |
| 3,975,706 | 8/1976 | Kato | 340/52 A |
| 4,016,533 | 4/1977 | Ishikawa et al. | 340/52 A |
| 4,020,454 | 4/1977 | Malonee | 340/52 B |
| 4,147,236 | 4/1979 | Steffen et al. | 188/1 A |
| 4,188,613 | 2/1980 | Yang et al. | 340/52 A |
| 4,204,190 | 5/1980 | Wiley et al. | 340/52 A |
| 4,241,603 | 12/1980 | Han et al. | 73/129 |
| 4,298,857 | 11/1981 | Robins et al. | 340/52 A |
| 4,387,789 | 6/1983 | Borugian | 188/1.11 |
| 4,508,196 | 4/1985 | Jamon | 188/1.11 |
| 4,520,661 | 6/1985 | Tamai et al. | 73/129 |
| 4,562,421 | 12/1985 | Duffy | 340/52 A |
| 4,604,604 | 8/1986 | Mann | 340/52 A |
| 4,606,435 | 8/1986 | Johnson | 188/1.11 |
| 4,641,519 | 2/1987 | Klein et al. | 73/129 |
| 4,646,001 | 2/1987 | Baldwin et al. | 324/65 P |
| 4,649,370 | 3/1987 | Thomason | 340/52 B |
| 4,658,936 | 4/1987 | Moseley | 188/1.11 |
| 4,674,326 | 6/1987 | Reinecke | 73/129 |
| 4,790,606 | 12/1988 | Reinecke | 303/103 |
| 4,824,260 | 4/1989 | Novotny et al. | 374/179 |
| 4,869,350 | 9/1989 | Fargier et al. | 188/1.11 |
| 4,964,679 | 10/1990 | Rath | 303/100 |
| 4,971,179 | 11/1990 | Gabhardt et al. | 188/33 |
| 5,079,947 | 1/1992 | Feldmanmn et al. | 73/129 |

(List continued on next page.)

Primary Examiner—Robert J. Oberleitner
Assistant Examiner—Thomas J. Williams
(74) Attorney, Agent, or Firm—Carlson, Gaskey & Olds

(57) ABSTRACT

A system for determining the amount of material in a brake lining includes a frictional brake surface and a brake lining having a sensor for producing an output signal indicating the temperature of the sensor. A brake actuation system actuates the brake lining against the frictional brake surface and, thereafter, releases the brake lining from the frictional brake surface. A timer measures a time period beginning when the brake lining is released from the frictional brake surface and ending when the sensor output signal reaches a return point indicative of the brake lining having cooled. A controller compares the measured time period to electronically stored predetermined values to determine the thickness of the brake lining. The invention further includes a method for determining the amount of brake lining material based upon this structure.

12 Claims, 1 Drawing Sheet

U.S. PATENT DOCUMENTS

| | | | |
|---|---|---|---|
| 5,151,681 | 9/1992 | Valmir et al. | 340/454 |
| 5,168,260 | 12/1992 | Mery | 340/454 |
| 5,189,391 | 2/1993 | Feldmann et al. | 340/453 |
| 5,302,940 | 4/1994 | Chen | 340/454 |
| 5,307,673 | 5/1994 | Ito et al. | 73/129 |
| 5,372,221 | 12/1994 | Jalbert | 188/1.11 |
| 5,419,415 | 5/1995 | Lamb et al. | 188/1.11 |
| 5,559,286 | 9/1996 | White et al. | 73/129 |
| 5,637,794 | 6/1997 | Hanisko | 73/121 |
| 5,651,431 | 7/1997 | Kyrtsos | 188/1.11 L |
| 5,668,529 | 9/1997 | Kyrtsos | 340/454 |
| 5,909,171 * | 6/1999 | Kyrtsos | 188/1.11 W |
| 5,939,978 * | 8/1999 | Kyrtsos | 188/1.11 W |

* cited by examiner

SYSTEM AND METHOD FOR DETERMINING BRAKE LINING WEAR BASED ON COOLING WAVE PROPAGATION TIME

BACKGROUND OF THE INVENTION

This application relates to a system and method for determining the thickness of a brake lining based on cooling wave propagation time.

Most motor vehicles include a brake system having a set of brake shoe assemblies for retarding the rotation of the wheels of the vehicle when the brakes are applied. Typically, each brake shoe assembly includes a brake lining made of a friction material which gradually wears away during brake applications. After numerous brake applications, the brake lining wears below a critical material thickness and, therefore, should be replaced. As a result, the brake lining must be periodically inspected for excessive wear. Thus, it is desirable to provide an indication when the brake lining thickness is worn such that the brake shoes should be changed.

Several problems arise when trying to determine whether the brake linings have sufficiently worn such that they need to be changed. Often, the wheel must be removed from the vehicle so that the brake lining thickness can be measured. This is cumbersome and time consuming. Visual brake lining wear indicators, such as notches in the lining or color coded layers in the lining, have been used to determine when the linings should be changed. When a visual wear indicator is used, an inspector can visually examine each brake lining to determine whether the brake lining requires replacement without physically measuring the thickness of the brake lining material, However, the use of visual wear indicators can also be cumbersome and time consuming because visual wear indicators require the inspector to visually check each lining while the vehicle is stationary. Thus, it is desirable to have an efficient way to monitor the brake lining thickness during the operation of the vehicle to indicate whether the brake linings require replacement without having to visually inspect each brake lining.

The assignee of this application has recently developed systems that monitor brake lining thickness during the operation of the vehicle by using a brake lining including a single temperature sensing device. Typically, the electrical resistance of the temperature sensing device changes with the temperature of the brake lining. In these systems, the thickness of the brake lining is determined by monitoring the increase or rise in temperature of the brake lining during a brake application. During each brake application, a "heat wave" is produced on the surface of the brake lining. The amount of time it takes for the "heat wave" to travel from the surface of the brake lining to the temperature sensing device embedded in the brake lining is measured and recorded. This time period is commonly referred to as the heat wave propagation time. The thickness of the brake lining is a function of the heat wave propagation time and, therefore, the brake lining thickness may be calculated using the measured heat wave propagation time. In general, a long heat wave propagation time indicates a thick brake lining and a short heat wave propagation time indicates a thin brake lining. However, during certain braking conditions, such as light braking applications, both the braking duty cycle and the amount of brake pressure applied during the brake application affects the heat wave propagation. That is, the force applied on the brake shoe and duty cycle of the application may affect the temperature rise and, therefore, the time it takes to reach a threshold temperature of the sensing device. Thus, it would be possible to improve upon this type of system, independent of these input variables.

SUMMARY OF THE INVENTION

In a disclosed embodiment of this invention, a system for determining the amount of material in a brake lining includes a frictional brake surface and a brake lining having a sensor for producing an output signal indicating the temperature of the sensor. A brake actuation system actuates the brake lining against the frictional brake surface and, thereafter, releases the brake lining from the frictional brake surface. A timer measures a time period beginning when the brake lining is released from the frictional brake surface and ending when the sensor output signal reaches a zero slope point. A controller compares the measured time period to electronically stored predetermined values to determine the thickness of the brake lining. Thus, unlike the prior art, the present invention measures wave propagation time after, rather than during, a brake application. In other words, the present invention determines the thickness of the brake lining by measuring the time that it takes for a cooling wave to propagate or travel from the surface of the brake lining to the sensor. Unlike the propagation time of a heat wave, the propagation time of a cooling wave is not dependent upon the amount of brake pressure applied during the brake actuation. In a preferred embodiment, the controller transmits a warning signal to activate a remote warning device when the thickness of the brake lining wears below a predetermined wear level.

The invention includes a method for determining the amount of material in the brake lining in a brake system having a frictional brake surface, a brake lining including a sensor for producing an output signal indicating the temperature of the sensor, and a brake actuation system. The method includes the steps of: actuating the brake lining against the frictional brake surface thereby increasing the temperature of the brake lining and the sensor; releasing the brake lining from the frictional brake surface; measuring a time period beginning when the brake lining is released from the frictional brake surface and ending when the sensor output signal reaches a zero slope point; and comparing the measured time period to electronically stored predetermined values to determine the thickness of the brake lining. A preferred method includes the steps of producing a warning signal when the thickness of the brake lining wears below a predetermined wear level, and activating a remote warning device when the thickness of the brake lining wears below a predetermined wear level.

These and other features of the present invention will be best understood from the following specification and drawings, the following of which is a brief description.

DETAILED DESCRIPTION OF THE PREFERRED EMBODIMENT

Figure 1:
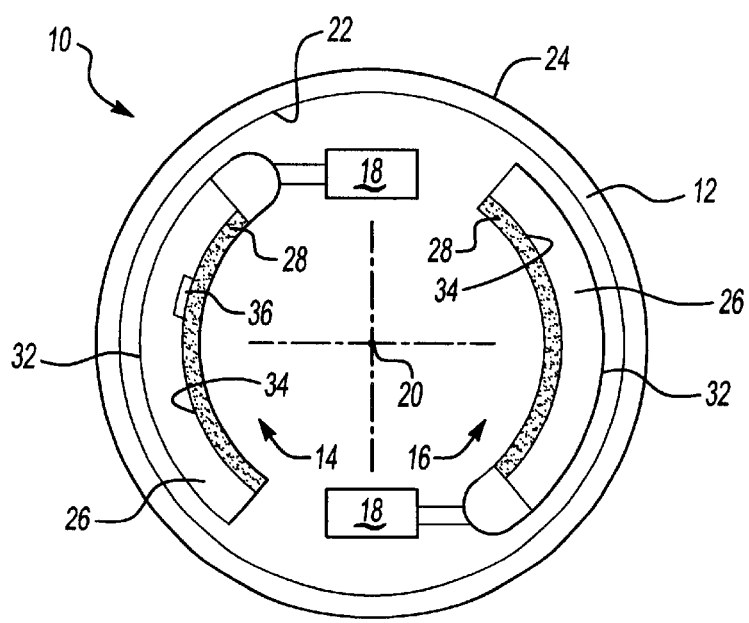
FIG. 1 is a side view of a drum brake system including a brake lining having a temperature sensor in accordance with the present invention.

Referring to FIG. 1, a brake lining having a temperature sensor in accordance with the present invention is shown installed in a vehicular brake system. The brake lining, as described below, may be incorporated into several different types of conventional brake systems including, but not limited to, drum brake systems and disc brake systems. Thus, the brake lining has been illustrated in a drum brake system in FIG. 1 for descriptive purposes only and not to limit the scope of the present invention.

FIG. 1 is a side view of a drum brake system 10. The drum brake system 10 includes a cylindrical brake drum 12, a first brake shoe assembly generally shown at 14, a second brake shoe assembly generally shown at 16, and an actuation system 18. The general operation of the brake drum assembly 10 is known. The first and second brake shoe assemblies 14 and 16 are preferably identical such that a description of the first brake shoe assembly 14 or its components is also applicable to the second brake shoe assembly 16. The drum brake system 10 can be of various types of systems such as an s-cam brake, a wedge brake, or a drum brake actuated by a hydraulic cylinder. The actuation system 18, shown schematically in FIG. 1, represents any known actuating mechanism for drum brake systems such as an s-cam mechanism, a wedge mechanism, or a hydraulic cylinder. The actuation system 18 moves the first and second brake shoe assemblies 14 and 16 into contact with the rotating brake drum 12 and can be controlled hydraulically or pneumatically. Also, as known, a single actuator could move both the first and second brake shoe assemblies 14 and 16 into contact with the rotating brake drum 12.

The brake drum 12, which rotates about an axis of rotation 20, has an inner surface 22 and an outer surface 24. The first and second brake shoe assemblies 14 and 16, located adjacent to the inner surface 22 of the brake drum 12, include a brake lining 26 having a predetermined thickness. The brake linings 26 are comprised of a known friction material attached to a backing plate 28. Each brake lining 26 presents a wear surface 32 which contacts the inner surface 22 of the rotating brake drum 12 when the actuation system 18 moves the first and second brake shoe assemblies 14 and 16 against the brake drum 12. Frictional contact between the wear surfaces 32 and the rotating brake drum 12 increases the temperature of each brake lining 26 and wears away the thickness of each brake lining 26. After numerous brake applications, the brake linings 26 eventually wear below a critical thickness and, therefore, should be replaced. Each brake lining 26 also includes an interface surface 34 which contacts the backing plate 28.

A temperature sensor 36, shown schematically in FIG. 1, measures the temperature of the brake lining 26. In accordance with the present invention, the temperature sensor 36 may be a thermocouple, thermistor, diode, or other similar temperature measuring component. Frictional contact between the inner surface 22 of the rotating brake drum 12 and the wear surface 32 of the brake lining 26 during brake applications increases the temperature of both the brake lining 26 and the temperature sensor 36. In FIG. 1, the temperature sensor 36 is embedded in the brake lining 26. Alternatively, the temperature sensor 36 may be encapsulated in a housing assembled into the brake lining 26. The temperature sensor 36 can be incorporated in either the first and/or the second brake shoe assemblies 14 and 16, but typically need only be incorporated in one, and preferably the leading brake shoe assembly which experiences the most brake lining wear.

Figure 2:
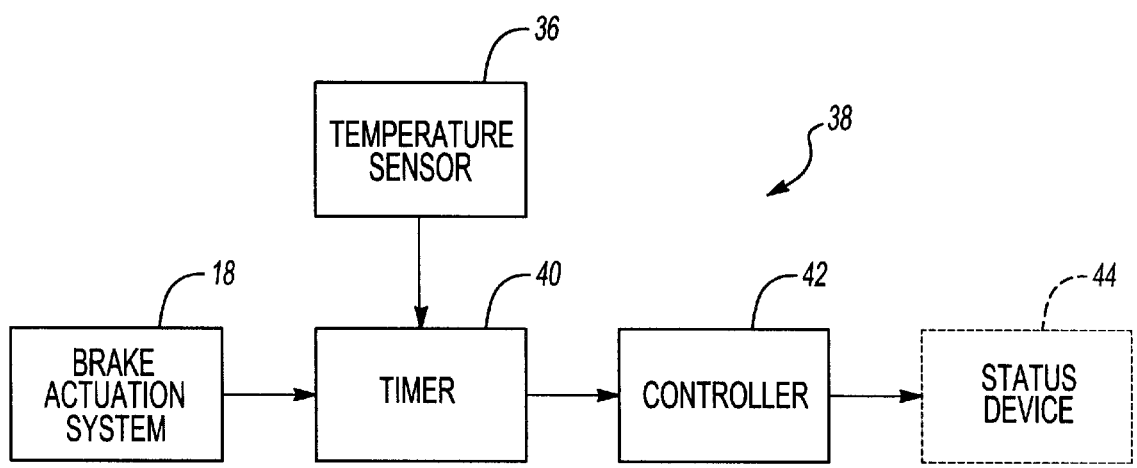
FIG. 2 is an electrical schematic diagram of a system for determining the thickness of the brake lining in accordance with the present invention.

FIG. 2 is an electrical schematic diagram of a system 38 for determining the thickness of the brake lining 26 in accordance with the present invention. The system 38 includes the brake lining 26 having the temperature sensor 36 for producing an output signal indicating the temperature of the sensor 36, the brake actuation system 18, a timer 40, a controller 42, and a frictional brake surface. In the drum brake system 10, as described above, the frictional brake surface is the inner surface 22 of the rotating brake drum 12. Alternatively, in a disc brake system, the frictional brake surface would be the inner or outer surface of a rotor.

During a brake application, the brake actuation system 18 actuates the brake lining 26 against the frictional brake surface, i.e. the inner surface 22 of the rotating brake drum 12. When the brake lining 26 is actuated against the frictional brake surface, a "heat wave" is produced on the brake lining surface 32. As the heat wave propagates or travels from the brake lining surface 32 to the temperature sensor 36, the temperature of the brake lining 26 increases. As a result of the heat wave propagation, the temperature sensor output signal gradually increases in value.

When the brake lining 26 is released from the frictional brake surface, a thin layer of air covers the brake lining surface 32 thereby producing a "cooling wave". As the cooling wave propagates or travels from the brake lining surface 32 to the temperature sensor 36, the temperature of the brake lining 26 decreases. When the cooling wave reaches the temperature sensor 36, the value of temperature sensor output signal peaks, as indicated by a zero slope point, and then gradually decreases. The zero slope point is the point at which the value of the temperature sensor output signal is no longer increasing but has not yet begun to decrease. The zero slope point indicates that the cooling wave has reached the sensor 36.

In accordance with the present invention, the timer 40 measures a time period beginning when the brake lining 26 is released from the frictional brake surface and ending when the temperature sensor output signal reaches a zero slope point. In other words, the timer measures the time it takes for the cooling wave to propagate from the brake lining surface 32 to the temperature sensor 36 after a brake application. This measured time period is transmitted from the timer 40 to the controller 42. The controller 42 compares the measured time period to electronically stored predetermined values to determine the thickness of the brake lining 26. Alternatively, the controller 42 could be as simple as storing a single value which serves as a boundary, after which the controller 42 can determine the brake lining 26 has worn such that it should be replaced.

In a preferred embodiment, the controller 42 transmits a warning signal to activate a remote warning device 44 when the thickness of the brake lining 26 has worn below a predetermined wear level. One of ordinary skill in the art will recognize that the controller 42 could transmit a plurality of warning signals to indicate several decreasing brake lining thickness wear levels.

Alternatively, the system 38 could simply measure the time it takes for the temperature sensor 36 to return to a predetermined low value. The predetermined low value could also be variable, such as based upon a comparison with an ambient temperature. The predetermined low value, or the zero slope point could be both described as a condition which is indicative of the brake temperature returning to a pre-braking condition. Thus, for purposes of this application these two conditions will be known as a return temperature condition. Other return temperature conditions are within the scope of this invention.

The present invention includes a method for determining the amount of material in the brake lining 26. The method includes the steps of: providing a frictional brake surface, a brake lining having a sensor for producing an output signal indicating the temperature of the sensor, and a brake actuation system; actuating the brake lining against the frictional brake surface thereby increasing the temperature of the brake lining and the sensor; releasing the brake lining from the frictional brake surface; measuring a time period beginning when the brake lining is released from the frictional brake surface and ending when the sensor output signal reaches a zero slope point; and comparing the measured time period to electronically stored predetermined values to determine the thickness of the brake lining. In this method, the step of releasing the brake lining from the frictional brake surface propagates a cooling wave from the brake lining surface toward the sensor and the zero slope point indicates that the cooling wave has reached the sensor.

A preferred method includes the steps of producing a warning signal when the thickness of the brake lining wears below a predetermined wear level, and activating a remote warning device when the thickness of the brake lining wears below a predetermined wear level.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A system for determining the amount of material in a brake lining comprising:
    a frictional brake surface;
    a brake lining having a thickness including a sensor for producing an output signal indicating the temperature of the sensor;
    a brake actuation system for actuating said brake lining against said frictional brake surface and thereafter releasing said brake lining from said frictional brake surface; and
    a timer for measuring a time period beginning when said brake lining is released from said frictional brake surface and ending when said sensor output signal reaches a return temperature condition, said time period represents the brake lining wear condition.

2. A system as set forth in claim 1 including a controller for comparing said measured time period to electronically stored predetermined values to determine the thickness of said brake lining.

3. A system as set forth in claim 2 wherein said controller transmits a warning signal to activate a remote warning device when the thickness of said brake lining wears below a predetermined wear level.

4. A system as set forth in claim 1, wherein said time rate determines when said sensor output signal reaches a zero slope point, said zero slope point being said return temperature condition.

5. A system as set forth in claim 4 wherein a cooling wave is propagated through said brake lining toward said sensor when said brake lining is released from said frictional surface and wherein said zero slope point indicates that said cooling wave has reached said sensor.

6. A method for determining the amount of material in a brake lining comprising the steps of:
    1) providing a frictional brake surface, a brake lining including a sensor for producing an output signal indicating the temperature of the sensor, and a brake actuation system;
    2) actuating the brake lining against the frictional brake surface thereby increasing the temperature of the brake lining and the sensor;
    3) releasing the brake lining from the frictional brake surface; and
    4) measuring a time period beginning when the brake lining is released from the frictional brake surface and ending when the sensor output signal reaches a return temperature condition, said time period represents the brake lining wear condition.

7. A method as set forth in claim 6 including the step of comparing the measured time period to electronically stored predetermined values to determine the thickness of the brake lining.

8. A method as set forth in claim 7 including the step of producing a warning signal when the thickness of the brake lining wears below a predetermined wear level.

9. A method as set forth in claim 7 including the step of activating a remote warning device when the thickness of the brake lining wears below a predetermined wear level.

10. A method as set forth in claim 6 wherein the step of releasing the brake lining from the frictional brake surface propagates a cooling wave through the brake lining toward the sensor and wherein the return temperature condition is a zero slope point indicating that the cooling wave has reached the sensor.

11. A system as forth in claim 1, wherein said return temperature condition is a predetermined low temperature.

12. A method as set forth in claim 6, wherein said return temperature condition is a predetermined low temperature.

* * * * *